TELEVISION TRANSMITTING CONTROLLABLE MARKING SYSTEM
Filed Jan. 20, 1948
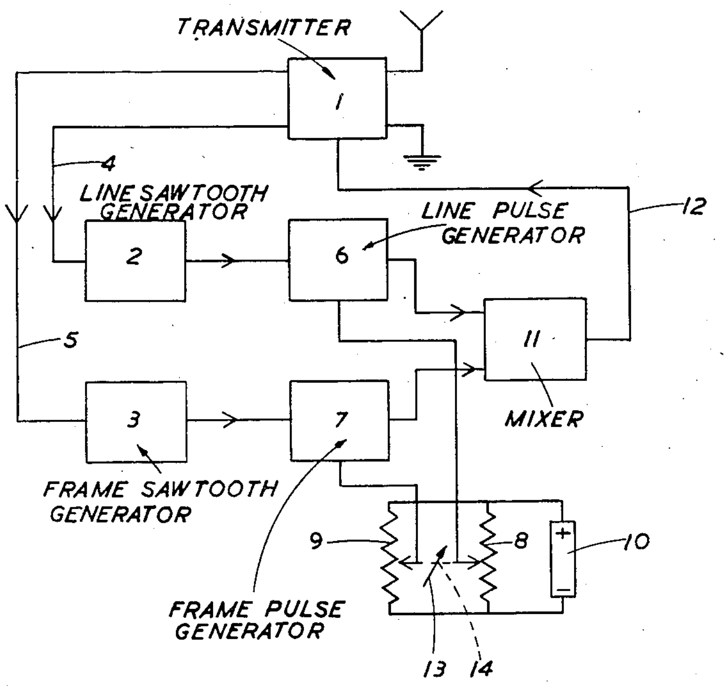
Inventors:
RONALD THOMAS CLAYDEN
WILLIAM RONALD GIBSON
By Ralph E. Atherton
Attorney Patented Dec. 9, 1952

2,621,246

UNITED STATES PATENT OFFICE 2,621,246

TELEVISION TRANSMITTING CONTROLLABLE MARKING SYSTEM

Ronald Thomas Clayden, London, and William Ronald Gibson, Iver, England, assignors to Electric & Musical Industries Limited, Hayes, England, a company of Great Britain Application January 20, 1948, Serial No. 3,338
In Great Britain January 21, 1947

4 Claims. (Cl. 178—5.8)

This invention relates to television transmitting controllable marking system.

In television broadcasts it is sometimes desirable to draw the attention of the audience receiving the broadcast to a feature of interest in the picture, especially during commentaries on outside broadcasts. The object of the present invention is to provide improved apparatus whereby this can be done simply and effectively.

According to the present invention there is provided television transmitting apparatus comprising means for generating marking signals independently of the picture signals, means for varying the timing of said marking signals, and means for causing said signals to modulate the picture signal carrier so that at a receiver the marking signals cause an indicator to appear in a desired position in the reconstituted picture.

Preferably, said means for generating said marking signals comprises means for generating signals at line frequency and further signals at frame frequency, the timing of said marking signals being varied by varying the timing of said signals at line and frame frequency.

In order that the invention may be clearly understood and readily carried into effect, it will now be more fully described with reference to the accompanying drawing, wherein one example of television apparatus in accordance with the invention is illustrated in block form.

Referring to the drawing, the apparatus illustrated comprises a television transmitter 1 which may be of any conventional design arranged to transmit picture signals interspersed with line and frame synchronising signals, and the transmitter embodies a circuit for producing marking signals, the circuit comprising two sawtooth waveform generators 2 and 3, which are respectively arranged to generate sawtooth waveform oscillations of line frequency and frame frequency under the control of line synchronising signals and frame synchronising signals applied from the transmitter by conductors 4 and 5. Each of the sawtooth waveform generators 2 and 3 may for example be of a construction similar to that described with reference to Figures 4–26, page 138, in "Ultra-High Frequency Techniques," by J. G. Brainard et al., published in 1942 by D. van Nostrand Company, Inc. The sawtooth waveform produced by the generator 2 is applied to a pulse generator 6 which is caused to produce pulses at line frequency, while the sawtooth waveform produced by the generator 3 is applied to a second pulse generator 7 which is caused to produce pulses at frame frequency.

The pulse generators 6 and 7 may comprise for example, blocking oscillators similar to the oscillator 19 described in United States Patent No. 2,101,520 or aperiodic multivibrators (that is, so-called "flip-flops"), similar to that described with reference to Figure 35, page 59, of "Time Bases" by O. S. Puckle, published in 1945 by Chapman and Hall Ltd., London. The sawtooth waveform potential applied to the pulse generator 6 has superimposed on it a potential applied from the tapping point of a potentiometer 8 while the sawtooth waveform potential applied to the pulse generator 7 has superimposed on it a potential applied from the tapping point of a potentiometer 9, the potentiometers 8 and 9 being connected in parallel across a suitable potential source 10. The superimposed potentials applied to each generator serve in known manner to determine the firing time of the respective pulse generator; the pulse generator being arranged to fire when the applied potentials reach a predetermined amplitude, and by operating the potentiometers 8 and 9, so as to vary the potentials applied therefrom to the pulse generators 6 and 7, the firing time of the latter can be varied and hence the timing of the pulses can be varied with reference respectively to the line and frame synchronising signals applied to the sawtooth waveform oscillators 2 and 3. The pulse generators 6 and 7 are arranged so that the line pulses are each of about the same duration as one or more picture elements, while the frame pulses are each of about the same duration as one or more lines of the picture signals and the pulses are mixed together in a pulse mixing device 11 and applied to the television transmitter 1 by the conductor 12, where they are mixed with the picture signals and then caused to modulate the carrier. The mixing device 11 may for example be similar to that described with reference to Figure 4 in United States Patent No. 2,147,266.

At a receiver the pulses at line frequency will cause a vertical line to appear in the reconstituted picture while the pulses at frame frequency will cause a horizontal line to appear in the picture, the lines forming an indication which can be used to mark a feature of interest at the intersection of the lines. It will be evident that the lines can be caused to move by an operator, for example a commentator at the transmitter, as the feature of interest changes position, by operating the potentiometers 8 and 9.

The lines will appear either black or white according to the relative polarities of the marking pulses and the picture signals when they are mixed together.

Modifications may of course be made to the example described so as to produce indications which have a different form. For example the pulse mixing device 11 may comprise a switching circuit, for example a valve connected similarly to the valve 39 in Figure 14 of United States Patent No. 2,192,122, so that it yields a pulse at its output only at the instant when one of the pulses at line frequency occurs simultaneously with a pulse at frame frequency. If this output pulse is then mixed with the picture signals in the transmitter 1 and then caused to modulate the carrier, the indication in the reconstituted picture will be in the form of a spot.

Alternatively the pulse mixing device 11 comprises a further pulse generator circuit which produces under control of the pulses applied from the generators 6 and 7, a train of pulses which are mixed with the picture signals and then modulated on to the carrier, the train of pulses being such as to produce an indication in the form of a pattern of spots, lines or other marks, or of a closed figure such as a square or circle in the reconstituted picture. The form of the indication may of course be modified by modifying said further pulse generator circuit so as to vary the train of pulses. If the device 11 comprises a further pulse generator, this may be of the kind utilizing a delay network such, for example, as described in United States Patent No. 2,265,996.

The means for operating the potentiometers 8 and 9 comprises a control handle indicated diagrammatically at 13, which may be in the form of a joystick mechanically linked to the potentiometer tappings by means of a suitable transmission indicated by the dotted line 14, whereby the horizontal component of any movement of the handle varies the potential applied to the pulse generator 6 which produces marking pulses at line frequency, and so varies the horizontal position of the indication in the reconstituted picture, while the vertical component of any movement varies the potential applied to the pulse generator 7 which produces the marking pulses at frame frequency, and so varies the vertical position of the indication. The control handle 13 alternatively takes the form of a pointer connected to the said potentiometers and arranged so that it can be pointed by the operator at the picture of a picture monitor, movement of the pointer in horizontal and vertical directions respectively varying the potentials applied to the said pulse generators, as explained above.

In a further modification of the example described the means for controlling the timing of the pulse generators 6 and 7 takes the form of a device having a surface on which is projected the picture being transmitted from the transmitter 1, the device being such that when the surface is touched by the operator it causes potentials to be generated proportional to the co-ordinates of the point at which the surface is touched. A device of this kind is described in British patent specification No. 588,043 and it gives a commentator much the same facilities as a lecturer pointing at a diagram or the like.

In a further example of the invention the marking signals are produced by an auxiliary television camera which is directed at a surface with a required indicating pattern marked or projected on it, the output from this camera, comprising marking signals, being mixed with the picture signals and modulated on to the carrier as previously described. Relative horizontal or vertical movement between the auxiliary camera and the said surface with the indicating pattern on it will then cause the indicator which appears in the reconstituted picture to move relatively to the picture. The size of the indicator in the picture can also be controlled by varying the distance between said auxiliary camera and said surface.

We claim:

1. A television transmitting apparatus comprising means for transmitting picture signals interspersed with line synchronising signals and frame synchronising signals, means for transmitting marking signals mixed with said picture signals, said latter means comprising a thermionic valve pulse generator for generating pulses of line frequency, a separate thermionic valve pulse generator for generating pulses of frame frequency, adjustable biassing means for said first pulse generator for adjusting the timing of said pulses of line frequency with reference to said line synchronising signals, adjustable biassing means for said second pulse generator for separately adjusting the timing of said pulses of frame frequency with reference to said frame synchronising signals, means for producing a single train of marking signals with timing determined by the timing of said pulses of line frequency and of said pulses of frame frequency, and means for mixing said marking signals with said picture signals to produce an indication on a picture reconstituted from said picture signals in response to said marking signals, the co-ordinates of said indication being adjustable by the operation of said adjustable means.

2. A television transmitting apparatus comprising means for transmitting picture signals interspersed with line synchronizing signals and frame synchronizing signals, and means for transmitting marking signals mixed with said picture signals, said latter means comprising a thermionic valve pulse generator for generating pulses of line frequency, a separate thermionic valve pulse generator means for generating pulses of frame frequency, adjustable biassing means for said first pulse generator for adjusting the timing of all said pulses of line frequency in a like sense with reference to said line synchronizing signals, adjustable biassing means for said second pulse generator for separately adjusting the timing of all said pulses of frame frequency in a like sense with reference to said frame synchronizing signals, and means for mixing said pulses of line frequency and said pulses of frame frequency with said picture signals to produce marking signals interspersed with said picture signals, thereby to produce an indication on a picture reconstituted from said picture signals in response to said marking signals, the co-ordinate of said indication being adjustable by said adjustable means.

3. A television transmitting apparatus comprising means for transmitting picture signals interspersed with line synchronizing signals and frame synchronizing signals, and means for transmitting marking signals mixed with said picture signals, said latter means comprising a thermionic valve pulse generator for generating pulses of line frequency, a separate thermionic valve pulse generator for generating pulses of frame frequency, adjustable biassing means for said first pulse generator for adjusting the timing of all said pulses of line frequency in a like sense with reference to said line synchronizing signals, adjustable biassing means for said second pulse generator for separately adjusting the timing of all said pulses of frame frequency in a like sense with reference to said frame synchronizing signals, means for applying said line frequency pulses and said frame frequency pulses to a further pulse generating circuit to produce a train of marking signals with timing determined by said line frequency pulses and said frame frequency pulses, and means for mixing said marking signals with said picture signals to produce an indication on a picture reconstituted from said picture signals in response to said marking signals, the co-ordinates of said indication being adjustable by said adjustable means.

4. Television transmitting apparatus comprising means for transmitting picture signals interspersed with line synchronizing signals and frame synchronizing signals, means for transmitting marking signals mixed with said picture signals, said latter means comprising means for generating a sawtooth waveform of line frequency synchronised with said line synchronising signals, means for separately generating a sawtooth waveform of frame frequency synchronised with said frame synchronising signals, a first thermionic valve pulse generator for generating pulses of line frequency controlled by said sawtooth waveform of line frequency, a second thermionic valve pulse generator for generating pulses of frame frequency controlled by said sawtooth waveform of frame frequency, means for applying bias potentials to said first and second pulse generators to determine the timing of the generated pulses of line frequency and frame frequency with reference to the respective sawtooth waveform potentials, manually operable means for separately adjusting said bias potentials to vary the timing of said generated pulses, means for producing a single train of marking signals with timing determined by the timing of said generated pulses, and means for mixing said marking signals with said picture signals.

RONALD THOMAS CLAYDEN.
WILLIAM RONALD GIBSON.

REFERENCES CITED

The following references are of record in the file of this patent:

UNITED STATES PATENTS

| Number | Name | Date |
|---|---|---|
| 2,240,420 | Schnitzer | Apr. 29, 1941 |
| 2,284,873 | Kemp | June 6, 1942 |
| 2,298,476 | Goldsmith | Oct. 13, 1942 |
| 2,403,975 | Graham | July 16, 1946 |
| 2,481,410 | Goldsmith | Sept. 6, 1949 |
| 2,487,641 | Denk | Nov. 8, 1949 |

OTHER REFERENCES

R. C. A. Review, December 1946, pages 612 to 632.